United States Patent
Kwon (10) Patent No.: US 10,054,194 B2
(45) Date of Patent: *Aug. 21, 2018

(54) AUTOMOBILE REDUCER

(71) Applicant: MANDO CORPORATION, Pyeongtaek-si, Gyeonggi-do (KR)

(72) Inventor: Hyun Bi Kwon, Yongin-si (KR)

(73) Assignee: MANDO CORPORATION, Pyeongtaek-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/988,679

(22) Filed: Jan. 5, 2016

(65) Prior Publication Data

US 2016/0201760 A1 Jul. 14, 2016

(30) Foreign Application Priority Data

Jan. 12, 2015 (KR) .................. 10-2015-0004011

(51) Int. Cl.
  *F16H 1/16* (2006.01)
  *F16H 55/24* (2006.01)
  *F16H 57/021* (2012.01)

(52) U.S. Cl.
  CPC .............. *F16H 1/16* (2013.01); *F16H 55/24* (2013.01); *F16H 2057/0213* (2013.01)

(58) Field of Classification Search
  CPC . F16C 25/06; F16H 1/16; F16H 57/15; F16H 2057/0213; F16H 55/24; B62D 5/0409

(Continued)

(56) References Cited

U.S. PATENT DOCUMENTS 5,800,070 A * 9/1998 Nilsson .................... B04B 9/12
  384/535
6,527,642 B1* 3/2003 Arai .................... B62D 5/0409
  180/444

(Continued)

FOREIGN PATENT DOCUMENTS

CN       103661576 A      3/2014
DE   102008009107 A1 *  8/2009  ........... B62D 5/0409

(Continued)

OTHER PUBLICATIONS

Chinese Office Action dated Sep. 22, 2017 corresponding to Chinese Application No. 201610017228.0.

*Primary Examiner* — Victor L MacArthur
*Assistant Examiner* — Bobby Rushing, Jr.
(74) *Attorney, Agent, or Firm* — Hauptman Ham, LLP (57) ABSTRACT

The present disclosure provides an automobile reducer including a worm shaft bearing coupled to an end of a worm shaft meshing with a worm wheel, the end lying opposite a portion of the worm shaft coupled to a motor shaft; a bush coupled to an outer peripheral surface of the worm shaft bearing, the bush having an incision formed by incising one side of the bush; a damper coupled to an outer peripheral surface of the bush inside a housing so as to force the bush against the worm shaft bearing and to elastically support between the housing and the worm shaft bearing; and a clearance compensation mechanism penetrating the damper and pressurizing the bush towards the worm wheel. The automobile reducer can accurately assist the driver's steering wheel manipulation.

7 Claims, 8 Drawing Sheets

(58) Field of Classification Search
USPC ..... 74/388 PS, 425, 409; 384/519, 535, 541, 384/581, 583, 247, 257, 258
See application file for complete search history.

(56) References Cited

U.S. PATENT DOCUMENTS

| | | | | |
|---|---|---|---|---|
| 7,523,805 | B2* | 4/2009 | Imagaki | B62D 5/0409 180/443 |
| 7,575,090 | B2* | 8/2009 | Shiina | B62D 5/0409 180/443 |
| 7,665,747 | B2* | 2/2010 | Arlt | B62D 3/12 280/93.514 |
| 8,336,412 | B1* | 12/2012 | Ishii | B62D 5/0409 180/444 |
| 8,535,251 | B1* | 9/2013 | Rao | A61H 31/007 601/41 |
| 2002/0017420 | A1* | 2/2002 | Kinme | B62D 5/0409 180/444 |
| 2004/0076353 | A1* | 4/2004 | Kubota | B62D 1/16 384/276 |
| 2006/0078244 | A1* | 4/2006 | Lee | F16C 27/04 384/535 |
| 2010/0140011 | A1* | 6/2010 | Wilkes | F16C 23/06 180/444 |
| 2014/0083794 | A1* | 3/2014 | Ishii | B62D 5/0409 180/444 |
| 2015/0360719 | A1* | 12/2015 | Kang | F16H 57/021 384/222 |

FOREIGN PATENT DOCUMENTS

| | | |
|---|---|---|
| DE | 10 2008 040 235 A1 | 1/2010 |
| DE | 10 2010 031 425 A1 | 1/2012 |
| WO | WO 2012138052 A1 * 10/2012 | ........... B62D 5/0409 |

* cited by examiner

AUTOMOBILE REDUCER

CROSS-REFERENCE TO RELATED APPLICATION

This application claims priority from and the benefit under 35 U.S.C. § 119(a) of Korean Patent Application No. 10-2015-0004011, filed on Jan. 12, 2015, which is hereby incorporated by reference for all purposes as if fully set forth herein.

BACKGROUND OF THE INVENTION

1. Field of the Invention

The present invention relates to an automobile reducer and, more particularly, to an automobile reducer capable of compensating for an excessively large or excessively small clearance, which is caused by an error related to manufacturing or assembling of a housing and a worm shaft bearing, and an excessively large backlash in connection with a worm shaft, which is caused by wear of a worm wheel, the automobile reducer being capable of compensating for an excessively small backlash in connection with the worm shaft, which is caused by moisture-absorbing expansion of the worm wheel, and the automobile reducer being capable of buffering the resisting force of the worm shaft with regard to the worm wheel, which results from an abrupt rotation of the worm wheel or from a change in the direction of rotation, thereby accurately assisting the driver's manipulation of the steering wheel.

2. Description of the Prior Art

Figure 1:
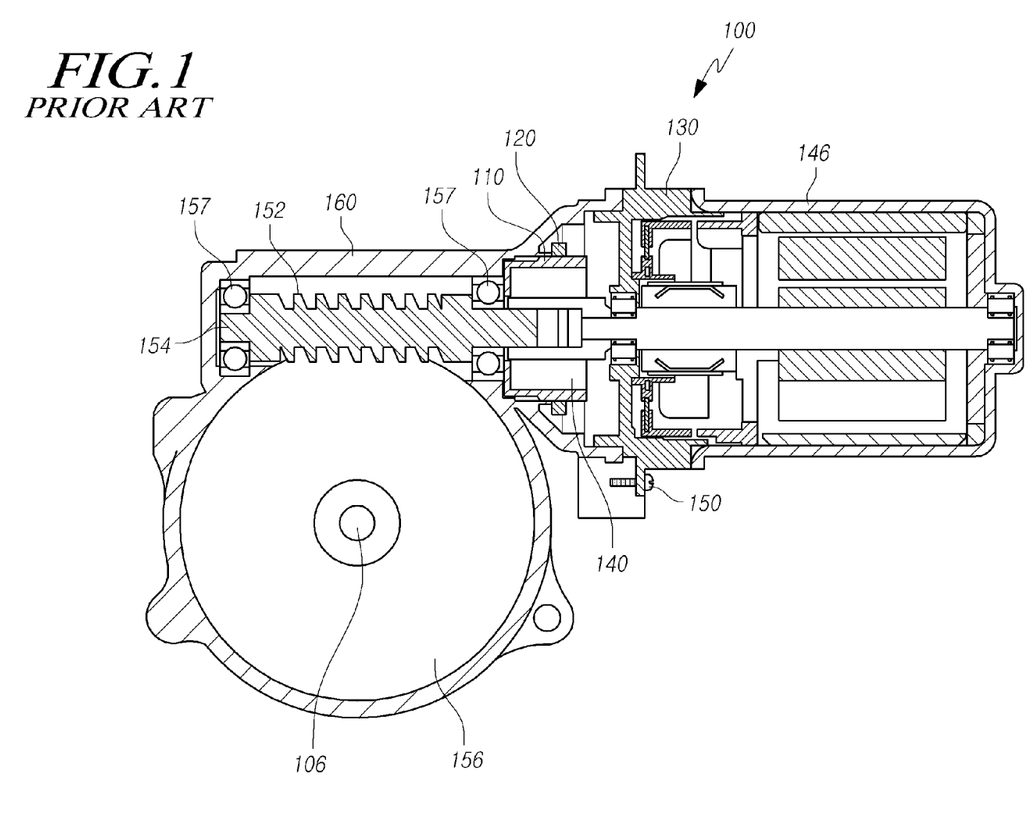
FIG. 1 is a sectional view illustrating a conventional automobile reducer.

FIG. 1 is a sectional view illustrating a conventional automobile reducer. As illustrated in FIG. 1, the conventional automobile reducer 100 is provided with a worm shaft 154, which has a worm 152 formed thereon. Worm shaft bearings 157 are formed on both ends of the worm shaft 154, respectively, so as to support the worm shaft 154. In order to prevent the worm shaft bearings 157 from playing in the axial direction of the worm shaft 154, a plug bolt 110 is fastened between a damping coupler 140 and the worm shaft bearings 157, and the plug bolt 110 is fixed by a plug nut 120.

The worm shaft 154 is connected to a motor 146 via the damping coupler 140, and the worm shaft 154 is structured to be rotated by driving of the motor 146.

In addition, a worm wheel 156 is provided on the outer diameter of the worm 152 so as to be able to mesh with the worm 152, which is formed on the worm shaft 154. The worm shaft 156 is mounted on a steering shaft 106, which transmits a rotating force of a steering wheel (not illustrated) manipulated by the driver, thereby providing such a structure that the rotating force of the worm shaft 154, which results from driving of the motor 146, is transferred to the steering shaft 106.

A gear housing 160 contains the worm 152, the worm wheel 156, and the like. The motor 146 is provided on one side of the gear housing 160 so as to provide the worm shaft 154 with a driving force. The gear housing 160 and the motor 146 are coupled through a bolt 150 by means of a motor cover 130.

An automobile reducer, which has a structure as described above, operates as follows: driving of the motor is controlled by an electronic control device, which is provided on the vehicle, according to the vehicle traveling condition, and the rotating force of the worm shaft, which results from driving of the motor, is added to the rotating force of the steering wheel, which is manipulated by the driver, and then transferred to the steering wheel, thereby maintaining the driver's steering driving state smoothly and stably.

However, there is a problem in that, if a resisting force occurs with regard to the worm wheel of the worm shaft due to an abrupt rotation of the worm wheel or a change in the direction of rotation, which results from an excessively large or excessively small clearance in connection with the housing caused by an error related to manufacturing or assembling of the housing and the worm shaft bearings, the worm shaft bearings come to collide inside the housing and generate rattle noise, thereby inconveniencing the driver.

There is another problem in that an excessively large or excessively small backlash in connection with the worm shaft occurs due to wear of the worm wheel or moisture-absorbing expansion of the worm wheel; such a backlash makes it impossible to accurately transfer a steering assist force, which assists the driver's steering wheel manipulating force, and generates loss of power between the worm shaft and the worm wheel; and the driver fails to be provided with the accurate steering assist force, meaning that the driver's steering feeling is degraded.

SUMMARY OF THE INVENTION

Accordingly, the present invention has been made in view of the above-mentioned background, and an aspect of the present invention is to provide an automobile reducer, which does not generate an excessively large or excessively small clearance in connection with the housing even if an error occurs during manufacturing or assembling of the housing and the worm shaft bearings, and which reduces rattle noise and does not inconvenience the driver.

Another aspect of the present invention is to provide an automobile reducer, which solves the problem of an excessively large or excessively small backlash in connection with the worm shaft resulting from wear of the worm wheel or moisture-absorbing expansion of the worm wheel, which thereby accurately transfers a steering assist force that assists the driver's steering wheel manipulating force, which does not generate loss of power between the worm shaft and the worm wheel, and which provides the driver with an accurate steering assist force, thereby improving the driver's steering feeling.

The aspect of the present invention is not limited thereto, and other unmentioned aspects of the present invention may be clearly appreciated by those skilled in the art from the following descriptions.

In accordance with an aspect of the present invention, there is provided an automobile reducer including: a worm shaft bearing coupled to an end of a worm shaft meshing with a worm wheel, the end lying opposite a portion of the worm shaft coupled to a motor shaft; a bush coupled to an outer peripheral surface of the worm shaft bearing, the bush having an incision formed by incising one side of the bush; a damper coupled to an outer peripheral surface of the bush inside a housing so as to force the bush against the worm shaft bearing and to elastically support between the housing and the worm shaft bearing; and a clearance compensation mechanism penetrating the damper and pressurizing the bush towards the worm wheel.

The present invention, which has the above-mentioned configuration, is advantageous in that provision of a damper and a bush prevents an excessively large or excessively small clearance in connection with the housing from being generated by an error related to manufacturing or assembling of the housing and the worm shaft bearing and buffers the resisting force of the worm shaft with regard to the worm wheel, which results from an abrupt rotation of the worm wheel or a change in the direction of rotation, thereby reducing rattle noise and avoiding any inconvenience to the driver.

There is another advantage in that the problem of an excessively large or excessively small backlash in connection with the worm shaft, which results from wear of the worm wheel or moisture-absorbing expansion of the worm wheel, is solved, thereby accurately transferring the steering assist force, which assists the driver's steering wheel manipulating force; there occurs no loss of power between the worm shaft and the worm wheel; the driver can be provided with the accurate steering assist force; and the driver's steering feeling therefore is improved.

BRIEF DESCRIPTION OF THE DRAWINGS

The above and other objects, features and advantages of the present invention will be more apparent from the following detailed description taken in conjunction with the accompanying drawings, in which:

FIG. 4A to FIG. 4D are partial sectional views illustrating an automobile reducer according to an embodiment of the present invention.

DETAILED DESCRIPTION OF THE EXEMPLARY EMBODIMENTS

Hereinafter, some of the embodiments of the present invention will be described in detail with reference to exemplary drawings. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 2:
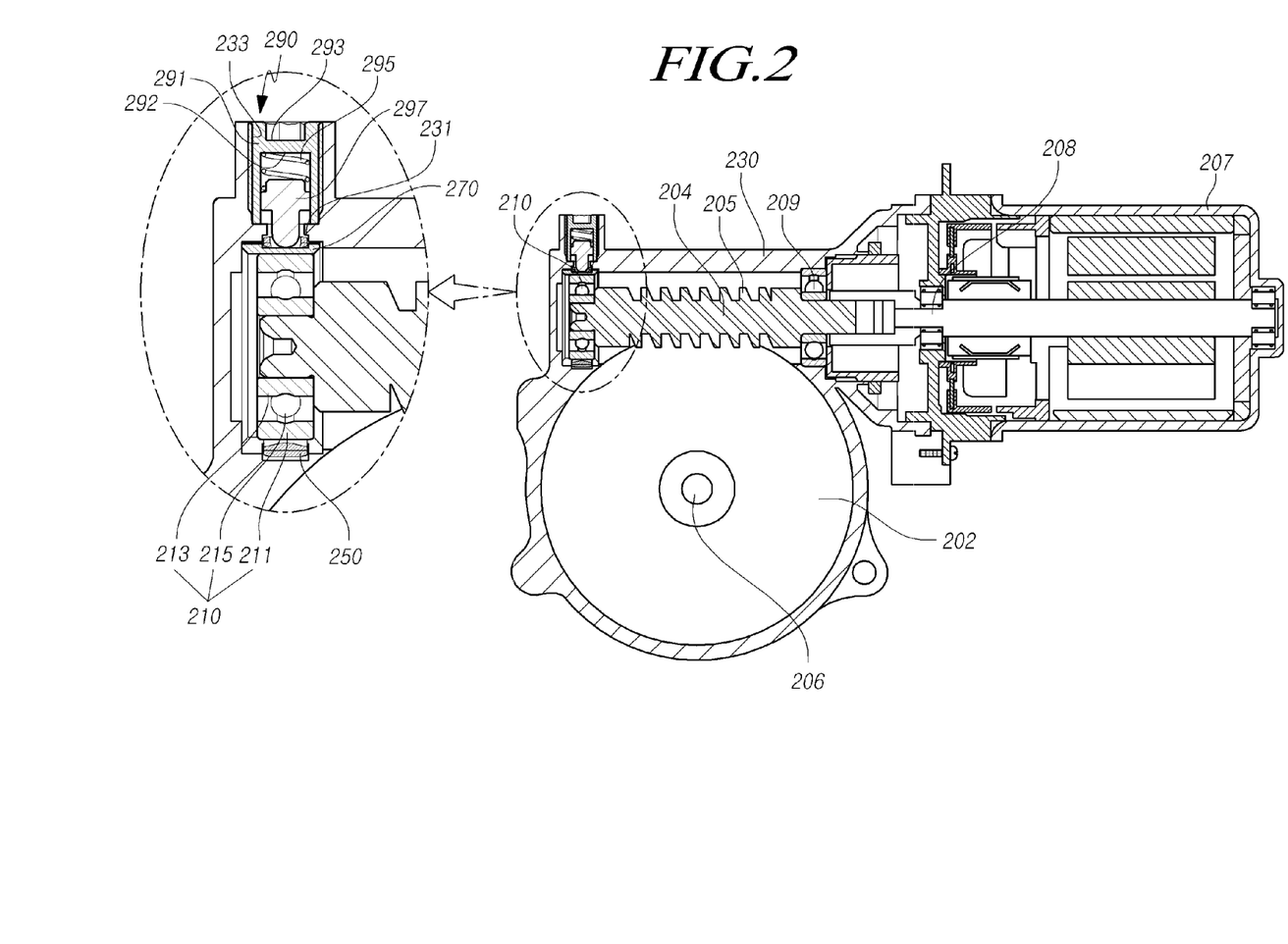
FIG. 2 is a sectional view of an automobile reducer according to an embodiment of the present invention.
Figure 3:
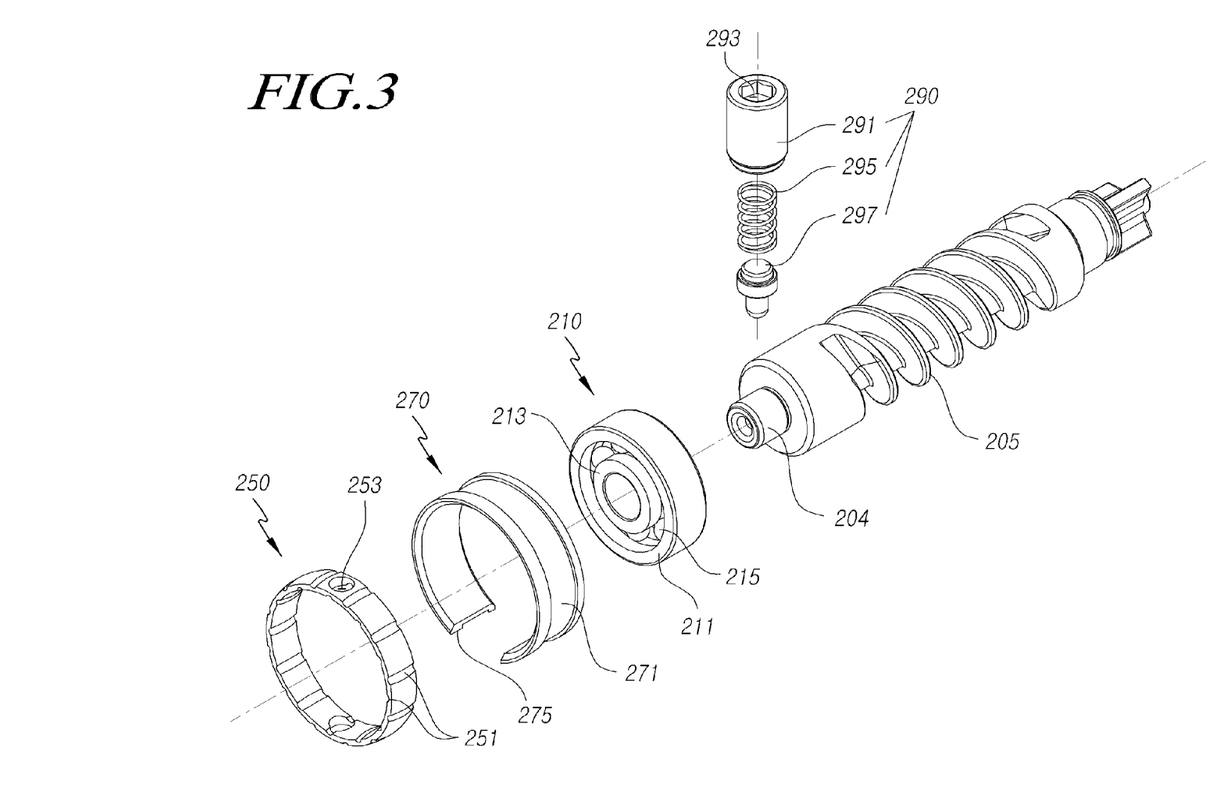
FIG. 3 is an exploded perspective view of FIG. 2.

FIG. 2 is a sectional view of an automobile reducer according to an embodiment of the present invention; FIG. 3 is an exploded perspective view of FIG. 2; FIG. 4A to FIG. 4D are partial sectional views illustrating an automobile reducer according to an embodiment of the present invention; and FIG. 5 is a partial sectional view of an automobile reducer according to another embodiment of the present invention.

As illustrated in the drawings, an automobile reducer according to an embodiment of the present invention is characterized by including a worm shaft bearing 210 coupled to an end of a worm shaft 204, which meshes with a worm wheel 202, the end lying opposite a part of the worm shaft 204 coupled to a motor shaft 208; a bush 270, which is coupled to the outer peripheral surface of the worm shaft bearing 210, and which has an incision 275 formed by incising one side thereof; a damper 250 coupled to the outer peripheral surface of the bush 270 inside the housing 230 so as to force the bush 270 against the worm shaft bearing 210 and to elastically support between the housing 230 and the worm shaft bearing 210; and a clearance compensation mechanism 290 penetrating the damper 250 so as to pressurize the bush 270 towards the worm wheel 202.

Such an automobile reducer can be applied not only to an electrically-operated power-assisted steering device, but also to any reducer using a worm shaft and a worm wheel. Therefore, it will be assumed, as an example, that the automobile reducer according to the present invention is provided on an electrically-operated power-assisted steering device.

The worm wheel 202 meshes with the worm shaft 204, and the worm wheel 202 is coupled to a steering shaft 206, which is connected to the steering wheel (not illustrated).

The worm shaft 204 is connected to a motor 207 and is rotated by driving of the motor 207. As described above, a worm 205, which is formed on the worm shaft 204, meshes with the worm wheel 202. Worm shaft bearings 209 and 210 are coupled to both ends of the worm shaft 204, respectively, and are coupled to the inner surface of the housing 230.

Among the worm shaft bearings 209 and 210, the worm shaft bearing 210, which is coupled to an end of the worm shaft 204 lying opposite the motor shaft 208, includes an inner race 213, which is coupled to an end of the worm shaft 204, an outer race 211, which is coupled to the inner surface of the housing 203, and a ball 215 coupled between the inner race 213 and the outer race 211.

A bush 270 and a damper 250 (described later) are coupled to the outer peripheral surface of the worm shaft bearing 210, thereby reducing noise and vibration, which result from an excessively large or excessively small clearance between the housing 230 and the worm shaft bearing 210, and buffering the resisting force of the worm shaft 204 with regard to the worm wheel 202, which is generated by an abrupt rotation of the worm shaft 204 or a change in the direction of rotation, such that the clearance between the worm wheel 202 and the worm shaft 204 is minimized.

The bush 270 has an incision 275 formed in a hollow shape by incising one side thereof, and is coupled to the outer peripheral surface of the worm shaft bearing 210.

The bush 270 is required to be made of a material having resistance to wear, low-friction property, predetermined degrees of bending and rigidity, and a low degree of heat-caused elongation. Therefore, the bush 270 is made of an engineering plastic-based material, such as polyacetal (POM), polyamide (PA), polycarbonate (PC), polyimide (PI), or polybutylene terephthalte (PBT).

The diameter of the bush 270, made of the above-mentioned engineering plastic-based material, is adjusted as the incision 275 becomes narrower or wider during assembly so that, even if an error occurs during manufacturing or assembling of the worm shaft bearing 210, any excessively large or excessively small clearance in connection with the housing 230 does not occur.

In addition, a damper 250 is coupled between the housing 230 and the bush 270 so as to buffer an impact between the housing 230 and the bush 270.

The damper 250 has a hollow shape and is coupled to the outer peripheral surface of the bush 270 inside the housing 230, thereby forcing the bush 270 against the worm shaft bearing 210, elastically supporting between the housing 230 and the worm shaft bearing 210, and compensating for an excessively large or excessively small clearance between the housing 230 and the bush 270 or between the bush 270 and the worm shaft bearing 210.

In addition, the damper 250 buffers the resisting force of the worm shaft 204 with regard to the worm wheel 202, vibration, and impacts occurring when an external impact is transferred during a rotation of the worm shaft 204 or when the direction of rotation of the worm wheel 202 changes.

The damper 250 is compressed and coupled between the housing 230 and the bush 270 during assembly. The damper 250 has slits 251 formed on one or both of the inner and outer peripheral surfaces thereof in the shape of recesses while being spaced from each other in the circumferential direction such that a predetermined level of rigidity is maintained even after compression.

Such formation of slits 251 on the damper 250 facilitates compression of the damper 250 between the housing 230 and the bush 270 and maintains rigidity even when the damper 250 is compressed between the housing 230 and the bush 270.

In this case, slits 251 formed on the outer peripheral surface and slits 251 formed on the inner peripheral surface are positioned to alternate along the circumferential direction, instead of corresponding to each other, thereby facilitating compression.

Specifically, it has been assumed, in connection with description of the present invention, that slits 251 are formed on both of the inner and outer peripheral surfaces of the damper 250 and, in this case, the slits 251 formed on the inner peripheral surface are positioned between respective slits 251 formed on the outer peripheral surface.

In order for the damper 250 to be coupled between the housing 230 and the bush 270, a groove 271 is formed on the outer peripheral surface of the bush 270 in the shape of a recess along the circumferential periphery between one side end and the other side end of the bush 270, and the damper 250 is coupled to the groove 271.

A coupling groove 231 is formed on the inner peripheral surface of the housing 230 in the shape of a recess so that, during a movement of the worm shaft 204, which results from an impact transferred from the outside or from a change in the direction of rotation of the worm wheel 202, the outer peripheral surface of the damper 250 is damped while being supported in the coupling groove 231 of the housing 230.

Therefore, one side end and the other side end of the outer peripheral surface of the bush 270, on which the groove 271 is not formed in the shape of a recess, are supported and fixed on the inner peripheral surface of the housing 230.

On the other hand, the inner peripheral surface of the housing 230 in a position, in which the worm shaft bearing 210, the bush 270, and the damper 250 are coupled, is formed in the shape of an ellipse having a large diameter directed towards or away from the worm wheel. Therefore, the worm shaft bearing 210 can move therein towards or away from the worm wheel 202; when the gear of the worm wheel 202 is worn as a result of endurance of the worm shaft 204 and the worm wheel 202, the worm shaft 202 is made to move towards the worm wheel 202; and, when the worm wheel 202 absorbs moistures and makes the gear expand, the worm shaft 204 is made to move away from the worm wheel 202.

In order to enable the worm shaft bearing 210 to move towards or away from the worm wheel 202, the damper 250 has a communication hole 253 formed therein so as to communicate with a penetration hole 233 of the housing 230, and a clearance compensation mechanism 290 is further provided to penetrate the communication hole 253 and to pressurize the bush 270 towards the worm wheel 202.

The clearance compensation mechanism 290 is inserted and installed into the penetration hole 233, which is formed in the housing 230, and includes an elastic member 295, which elastically supports the bush 270 towards the worm wheel 202, and an adjustment member 291, which is screw-coupled to the penetration hole 233 so as to adjust the elastic force of the elastic member 295.

The adjustment member 291 has a thread formed on the outer peripheral surface thereof so as to be screw-coupled to the penetration hole 233 of the housing 230; a tool groove 293 is formed on the outside of the adjustment member 291, a tool being coupled to the tool groove 293, so that the tool can adjust the depth of insertion of the adjustment member 291; and a receiving groove 292 is formed on the inside of the adjustment member 291, an elastic member 295 being inserted into the receiving groove 292 and guided.

Instead of forming a tool groove 293 on the outside of the adjustment member 291 so that it can be adjusted by a tool, such as a wrench, one side of the outer peripheral surface of the adjustment member 291 may be formed in an angled shape so that it can be adjusted by a tool, such as a spanner.

The elastic member 295 is guided in the receiving groove 292 of the adjustment member 291 so as to elastically support between the adjustment member 291 and the bush 270. The amount of compression of the elastic member 295 increases in proportion to the degree of insertion of the adjustment member 291, and the elastic force of the elastic member 295, which elastically supports the bush 270, increases accordingly.

The elastic member 295 may be made of a coil spring, for example, as illustrated in FIG. 2 to FIG. 4D.

The clearance compensation mechanism 290, which includes the adjustment member 291 and the elastic member 295, further includes a pressurization member 297, which penetrates the communication hole 253 and elastically supports the bush 270 towards the worm wheel 202, thereby stably supporting the bush 270.

The pressurization member 297 is made of metal, such as steel, or the above-mentioned engineering plastic-based material, and is provided between the elastic member 295 and the bush 270 so as to receive the elastic force from the elastic member 295 and to pressurize the bush 270 towards the worm wheel 202.

Using the elastic force from the elastic member 295, the pressurization member 297 elastically supports the bush 270, the worm shaft bearing 210, and the worm shaft 204 and, since the inner peripheral surface of the housing 230 is formed in an elliptical shape, the worm shaft 204 can move towards or away from the worm wheel 202 according to whether gear teeth of the worm wheel 202 are worn or the gear teeth become larger due to expansion of the worm wheel 202.

The mechanism of clearance compensation by the clearance compensation mechanism 290, which includes the adjustment member 291, the elastic member 295, and the pressurization member 297, will be described in detail with reference to FIG. 4A to FIG. 4D.

Figure 4A:
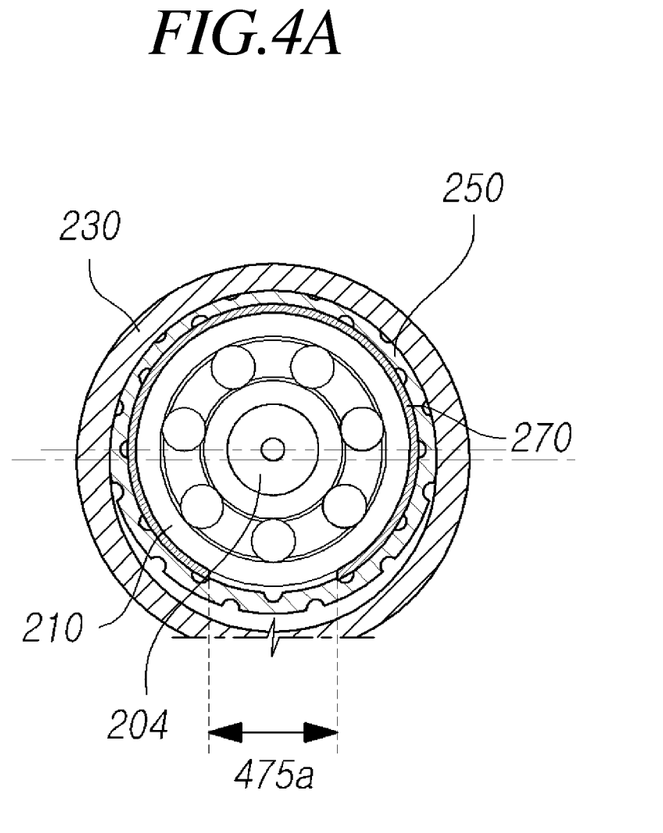
Figure 5:
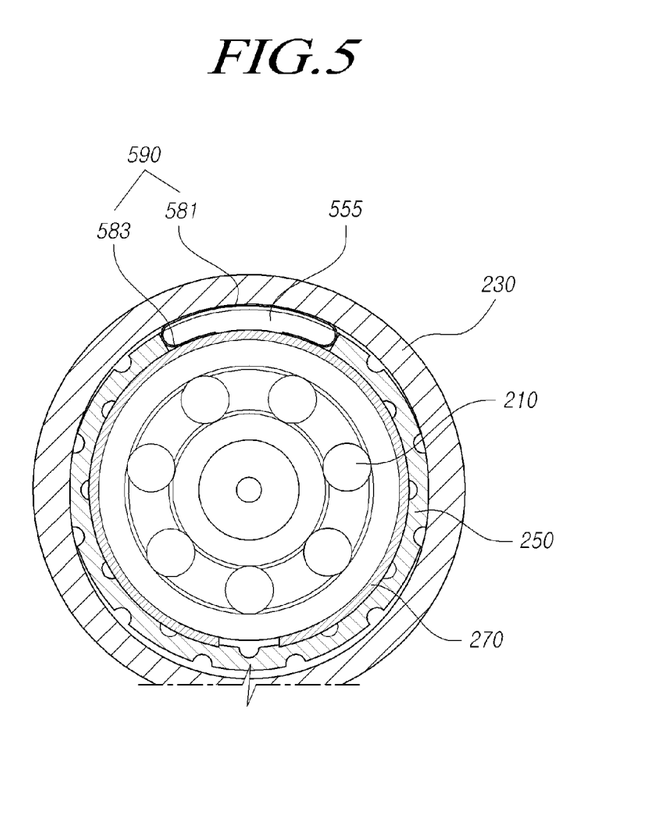
FIG. 5 is a partial sectional view of an automobile reducer according to another embodiment of the present invention.

FIG. 4A illustrates a state of coupling of the worm shaft 204, the worm shaft bearing 210, the bush 270, and the damper 250 to the inner peripheral surface of the housing 230, which is formed in an elliptical shape, in the absence of the clearance compensation mechanism 290.

The bush 270 is compressed such that the length of the incision 275 is reduced, during assembly, and coupled to the housing 230 so that, in the absence of the clearance compensation mechanism 290, the length 475a of the incision is smaller than the length of the incision 275 before assembling, thereby generating an elastic force that tends to increase the length 475a of the incision.

Figure 4B:
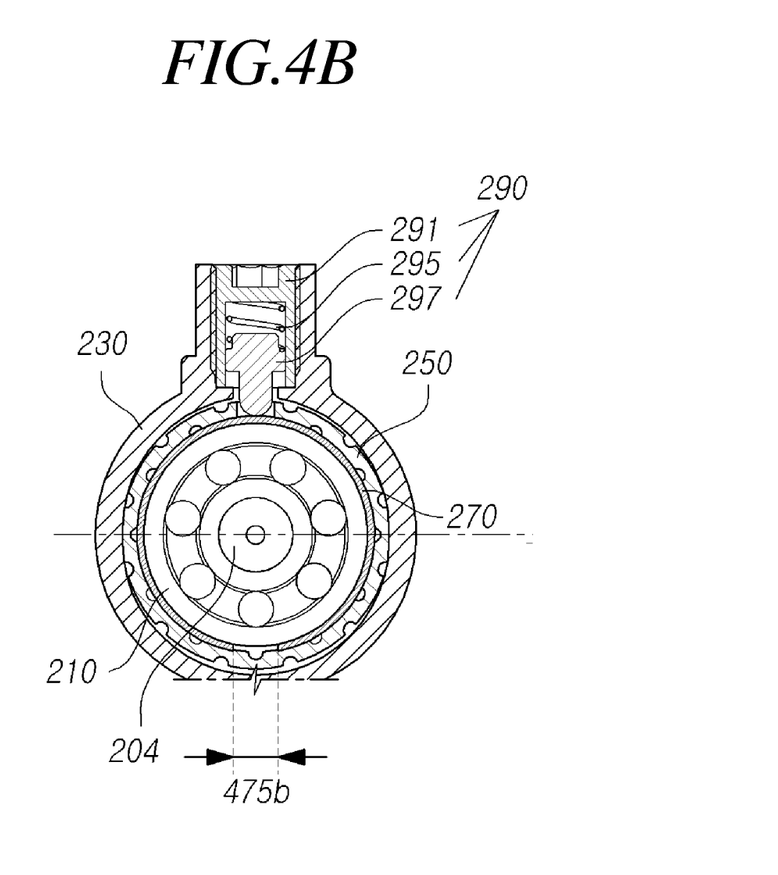

FIG. 4B illustrates a state in which the clearance compensation mechanism 290 is installed.

Installation of the clearance compensation mechanism 290 makes it possible to adjust the depth of insertion of the adjustment member 291 and to enable the pressurization member 297 to pressurize the bush 270; as a result, the worm shaft 204 moves towards the worm wheel 202 along the elliptical housing 230 and becomes set, thereby further reducing the length 475b of the incision of the bush 270.

Particularly, the housing 230 is formed in an elliptical shape such that the radius of curvature of the inner peripheral surface of the housing 230, which is contacted by the worm shaft 104 moving towards the worm wheel 202, gradually decreases either towards or away from the worm wheel 202; as a result, the bush 270 becomes narrower, and the length 475b of the incision, while the clearance compensation mechanism 290 pressurizes the bush 270, is smaller than the length 475a of the incision before the clearance compensation mechanism 290 is assembled.

Figure 4C:
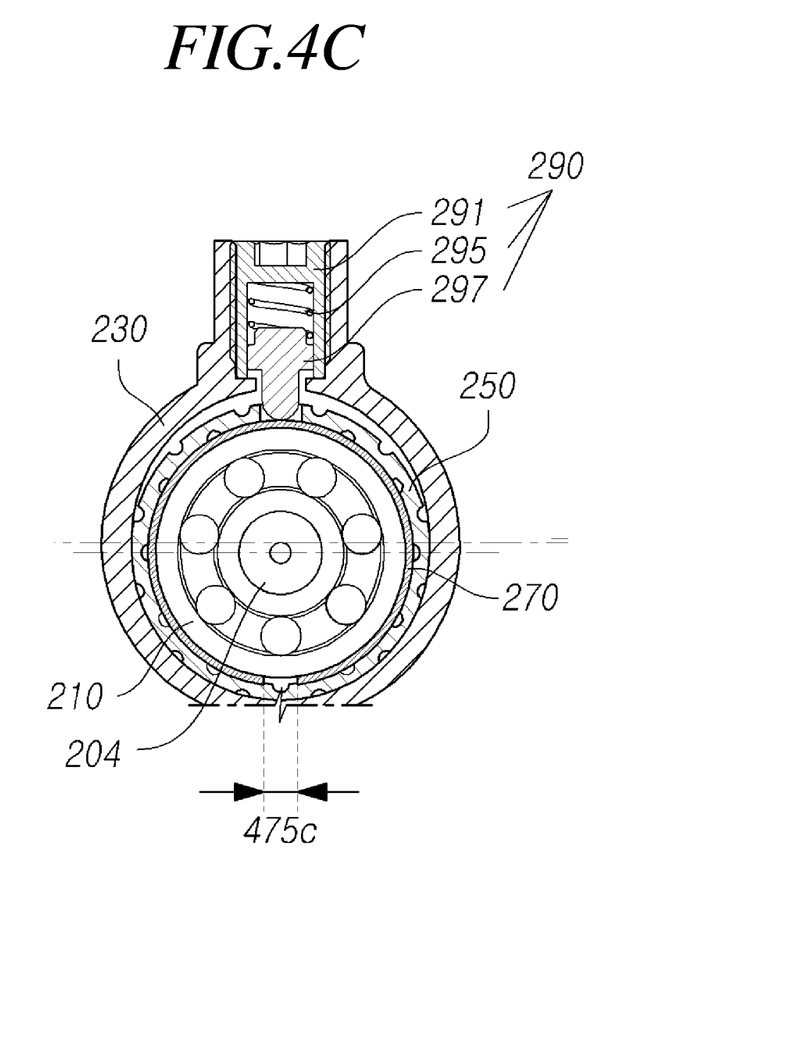
Figure 4D:
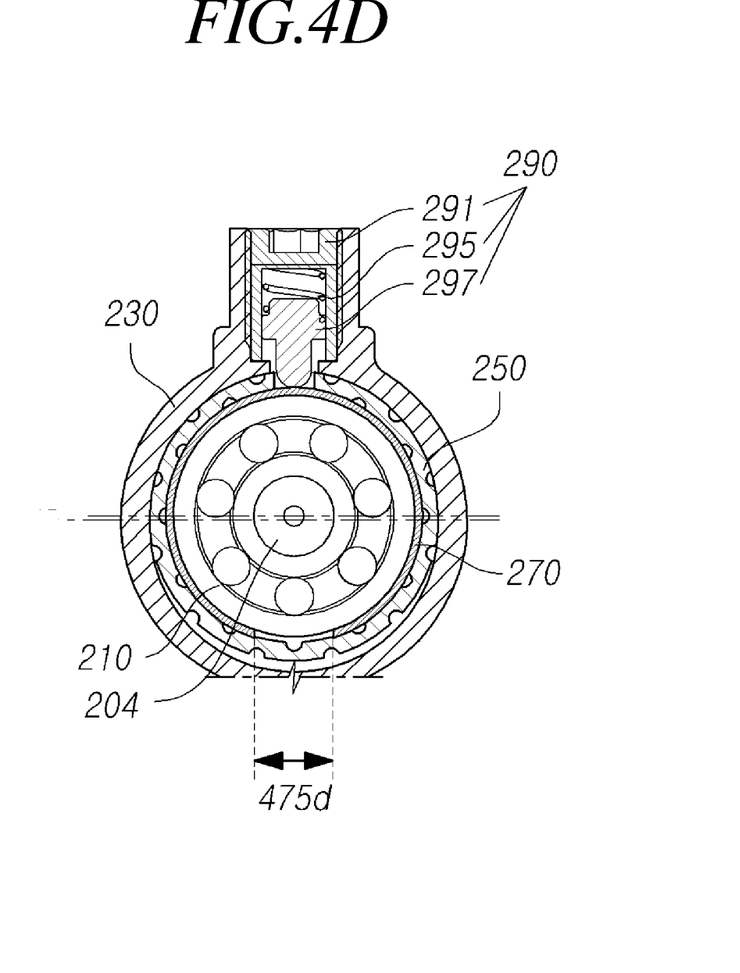

In addition, the backlash is compensated for, as illustrated in FIG. 4C and FIG. 4D, in order to solve the problem of occurrence of an excessively large or excessively small backlash in connection with the worm shaft 204, which is caused by wear of the worm wheel 202 while the clearance compensation mechanism 290 pressurizes the bush 270, as illustrated in FIG. 4B, or which is caused by moisture-absorbing expansion of the worm wheel 202.

When the gear of the worm wheel 202 is worn by endurance of the worm shaft 204 and the worm wheel 202, the worm shaft 204 is further moved towards the worm wheel 202 along the elliptical housing 230 by an elastic force from the elastic member 295 of the clearance compensation mechanism 290 and, since the radius of curvature of the inner peripheral surface of the housing 203 gradually decreases, the length 475c of the incision of the bush 270 is smaller than the length 475b of the incision illustrated in FIG. 4B.

Therefore, the upward/downward movement of the worm shaft 204 compensates for the excessively large backlash between the worm shaft 204 and the worm wheel 202, and the elastic force, which tends to increase the length 475c of the incision of the bush, tightly supports the damper and the housing, thereby reducing vibration and noise and facilitating transfer of power to the worm wheel 202 of the worm shaft 204.

When the worm wheel 202 absorbs moisture and expands, on the other hand, the gear teeth of the worm wheel 202 expand, as illustrated in FIG. 4D, so that the worm wheel 202 pushes the worm shaft 204 in the opposite direction and pressurizes the elastic member 295, and the worm shaft 204 simultaneously moves away from the worm wheel 202 along the elliptical housing 230 and abuts the inner peripheral surface of the housing 230. As a result, the radius of curvature of the inner peripheral surface of the housing 230 gradually decreases, and the length 475d of the incision of the bush 270 becomes larger than the length 475b of the incision illustrated in FIG. 4B.

Consequently, the bush 270 moves upwards/downwards along the elliptical inner peripheral surface of the housing 230 due to the elastic support by the elastic member 295, as described above, and the length of the incision 275 changes, thereby compensating for the clearance between the damper 250 and the housing 230.

That is, the change in length of the incision 275 of the bush, which moves along the elliptical inner peripheral surface of the housing 230, causes an elastic force, which tends to widen the same outwards, and which tightly supports the damper 250 on the housing 230, thereby solving the problem of vibration and noise.

Furthermore, the movement of the worm shaft 204 towards or away from the worm wheel 202 solves the problem of an excessively large or excessively small backlash in connection with the worm shaft 204 resulting from wear of the worm wheel 202 or moisture-absorbing expansion of the worm wheel 202.

This accurately transfers the steering assist force, which assists the driver's steering wheel manipulating force, prevents loss of power between the worm shaft 204 and the worm wheel 202, and guarantees that the driver is provided with the accurate steering assist force, thereby improving the driver's steering feeling.

It is to be noted that, although FIG. 4A to FIG. 4D magnify the elliptical shape of the inner peripheral surface of the housing, the length of the incision, and the movement of the worm shaft towards or away from the worm wheel, for convenience of description, the shape, length, and distance of movement are in fact small.

According to another embodiment of the clearance compensation mechanism 290 of the present invention, the clearance compensation mechanism 590 may be made of an elastic body, one side of which supports the inner peripheral surface of the housing 230, and the other side of which is inserted into the damper 250 so as to support the outer peripheral surface of the bush 270, and the elastic body may be made of a leaf spring, for example, as illustrated in FIG. 5.

Referring to FIG. 5, the clearance compensation mechanism 590 includes a support portion 581, which supports the inner peripheral surface of the housing 230, and bent portions 583, which are bent from both ends of the support portion 581, and which penetrate an insertion hole 555 formed on the damper 250, thereby elastically supporting the bush 270.

The bent portions 583, which are formed to bent inwards from both ends of the support portion 581, are elastically deformed and coupled between the housing 230 and the bush 270, thereby elastically supporting the bush 270 in a direction that defines a predetermined angle with regard to the direction in which the worm shaft 204 and the worm wheel 202 mesh with each other. This configuration not only solves the problem of an excessively large or excessively small backlash resulting from wear of the worm wheel 202 and moisture absorption, but also effectively buffers the resisting force of the worm shaft 204 with regard to the worm wheel 202.

That is, the clearance compensation mechanism 590 is compressed and assembled between the housing 230 and the bush 270, and wear of the gear of the worm wheel 202, resulting from endurance of the worm shaft 204 and the worm wheel 202, generates the problem of an excessively large backlash between the gear of the worm wheel 202 and the worm 205. The elastic force from the clearance compensation mechanism 590, which tends to move the bent portions 538 and the support 581 away from each other, pressurizes the bush 270, reduces the length of the incision 275 of the bush 270, and moves the worm shaft 204 towards the worm wheel 202, thereby guaranteeing stable meshing between the gear of the worm wheel 202 and the worm 205.

On the other hand, expansion of the worm wheel 202 due to moisture absorption generates the problem of an excessively small backlash between the gear of the worm wheel 202 and the worm 205. Elastic deformation of the bent portions 275 towards the support portion 581 compresses the clearance compensation mechanism 590, increases the length of the incision 275 of the bush 270, and moves the worm shaft 204 away from the worm wheel 202, thereby compensating for the excessively small backlash between the gear of the worm wheel 202 and the worm 205.

Furthermore, an abrupt rotation of the worm wheel 202 or a change in the direction of rotation thereof causes the worm shaft 204 to generate a resisting force. The clearance compensation mechanism 590 elastically supports the bent portions 583 on both sides, at two locations, in a direction that defines a predetermined angle with regard to the direction in which the worm shaft 204 and the worm wheel 202 meshes with each other, thereby effectively buffering the resisting force of the worm shaft 204 with regard to the worm wheel 202.

Additionally, the clearance compensation mechanism 290 according to an embodiment of the present invention may be provided at two locations so as to support the worm shaft 204 at two locations, just like the structure in which the clearance compensation mechanism 590 according to another embodiment of the present invention supports at two locations.

Embodiments of the present invention, which have the above-mentioned shapes and structures, are advantageous in that provision of a damper and a bush prevents an excessively large or excessively small clearance in connection with the housing from being generated by an error related to manufacturing or assembling of the housing and the worm shaft bearing and buffers the resisting force of the worm shaft with regard to the worm wheel, which results from an abrupt rotation of the worm wheel or a change in the direction of rotation, thereby reducing rattle noise and avoiding any inconvenience to the driver.

There is another advantage in that the problem of an excessively large or excessively small backlash in connection with the worm shaft, which results from wear of the worm wheel or moisture-absorbing expansion of the worm wheel, is solved, thereby accurately transferring the steering assist force, which assists the driver's steering wheel manipulating force; there occurs no loss of power between the worm shaft and the worm wheel; the driver can be provided with the accurate steering assist force; and the driver's steering feeling therefore is improved.

Even if it was described above that all of the components of an embodiment of the present invention are coupled as a single unit or coupled to be operated as a single unit, the present invention is not necessarily limited to such an embodiment. Therefore, exemplary embodiments of the present invention have been described for the sake of brevity and clarity. The scope of the present invention shall be construed on the basis of the accompanying claims in such a manner that all of the technical ideas included within the scope equivalent to the claims belong to the present invention.

BRIEF DESCRIPTIONS OF REFERENCE NUMERALS

202: worm wheel
204: worm shaft
205: worm
206: steering shaft
207: motor
208: motor shaft
209, 210: worm shaft bearings
211: outer race
213: inner race
215: ball
230: housing
231: coupling groove
233: penetration hole
250: damper
251: slit
253: communication hole
555: insertion hole
270: bush
271: groove
275: incision
290: clearance compensation mechanism
291: adjustment member
292: receiving groove
293: tool groove
295: elastic member
297: pressurization member
475a, 475b, 475c, 475d: lengths of incision
581: support portion
583: bent portions

What is claimed is:

1. An automobile reducer, comprising:
a housing;
a worm shaft bearing coupled to an end of a worm shaft meshing with a worm wheel, the end lying opposite a portion of the worm shaft coupled to a motor shaft;
a bush coupled to an outer peripheral surface of the worm shaft bearing, the bush having an incision formed by incising one side of the bush;
a damper coupled to an outer peripheral surface of the bush inside the housing so as to elastically support between the housing and the bush; and
a clearance compensation mechanism penetrating the damper and pressurizing the bush towards the worm wheel,
wherein the clearance compensation mechanism comprises:
an adjustment member including a receiving groove;
an elastic member being inserted into the receiving groove; and
a pressurization member coupled with the elastic member, and elastically supported by the elastic member towards the worm wheel,
wherein a longitudinal centerline of the pressurization member passes through a cylindrical center of the worm shaft bearing and damper,
wherein the bush has a groove formed in the shape of a recess along an outer circumferential periphery between one side end and the other side end, and the damper is arranged inside of the groove, and
wherein the damper has slits formed in the shape of recesses on both of outer and inner peripheral surfaces so as to extend from one axial end to the opposite axial end while being spaced from each other in a circumferential direction.

2. The automobile reducer of claim 1, wherein
the housing has a penetration hole formed such that the clearance compensation mechanism penetrates and is installed, and
the adjustment member is screw-coupled to the penetration hole so as to adjust an elastic force of the elastic member.

3. The automobile reducer of claim 2, wherein the damper has a communication hole formed in a position corresponding to the penetration hole, the communication hole communicating with the penetration hole.

4. The automobile reducer of claim 2, wherein the pressurization member comprises:
a first cylindrical part having a first diameter, and being inserted into the inside of the elastic member;

a second cylindrical part having a second diameter, and being directly contacted with the inner peripheral surface of the receiving groove; and a third cylindrical part having a third diameter, and pressurizing the bush towards the worm wheel by a head end of the third cylindrical part, the head end directly contacts with the bush, wherein the second diameter is greater than the first diameter, and the first diameter is greater than the third diameter, wherein the worm shaft bearing comprises an inner race coupled to the end of the worm shaft, an outer race coupled to the inner surface of the housing, and a ball coupled between the inner race and the outer race, and wherein a cylindrical axis of the head end passes through the cylindrical center of the worm shaft bearing.

5. The automobile reducer of claim 1, wherein the slits formed on the inner peripheral surface are positioned between respective slits formed on the outer peripheral surface.

6. The automobile reducer of claim 1, wherein a coupling groove is formed on an inner peripheral surface of the housing in the shape of a recess along a periphery, and an outer peripheral surface of the damper is supported in the coupling groove and damped.

7. The automobile reducer of claim 1, wherein an inner peripheral surface of the housing in a position, in which the worm shaft bearing, the bush, and the damper are coupled, is formed in the shape of an ellipse elongated towards or away from the worm wheel such that the worm shaft bearing can move towards or away from the worm wheel.

\* \* \* \* \*